Figure 1:
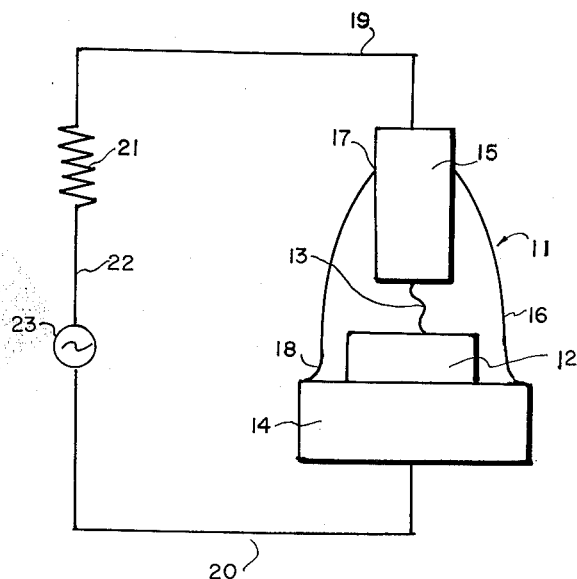

April 18, 1961 A. S. EPSTEIN 2,980,833
POINT CONTACT RECTIFIER DEVICE
Filed June 1, 1959

*INVENTOR.*
ARNOLD S. EPSTEIN
BY Lloyd B. Stevens, Jr.
ATTORNEY

United States Patent Office 2,980,833
Patented Apr. 18, 1961

2,980,833
POINT CONTACT RECTIFIER DEVICE
Arnold S. Epstein, Dayton, Ohio, assignor to Monsanto Chemical Company, St. Louis, Mo., a corporation of Delaware
Filed June 1, 1959, Ser. No. 817,348
17 Claims. (Cl. 317—236)

The invention relates to organic point contact rectifier devices. More particularly the invention involves polyphthalocyanine bodies useful in point contact rectifier devices. These bodies can suitably be in the form of discs, wafers, bars, rods, rectangular parallelepipeds, round, or most any geometric shape; however, preferred shapes are thin discs or plates.

It is well known in the art to employ certain inorganic materials as point contact rectifier components; however, no suitable organic material has previously been known. It has now been discovered that a certain type of organic materials are useful for this purpose. These materials which are polyphthalocyanines are described in detail in copending application Serial No. 696,027, filed November 13, 1957.

It is an object of this invention to provide new and useful point contact rectifier devices.

This and other objects of the invention will become apparent as the detailed description of the invention proceeds.

In making the polyphthalocyanine bodies of the invention pyromellitonitrile, a new compound described in copending application Serial No. 696,026, filed November 13, 1957, and now abandoned, is used. The tetrafunctional pyromellitonitrile provides the new class of polymeric material which can be illustrated by the structural formula

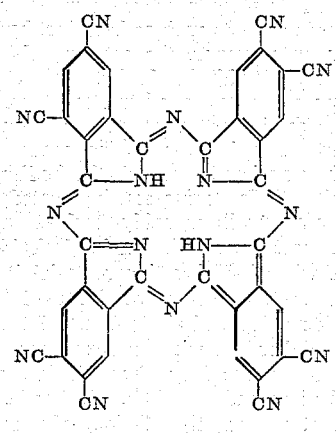

The pair of nitrile groups on each of the four cyclic portions of the phthalocyanine structure are in turn joined with and form a part of similar phthalocyanine structures to provide a polyphthalocyanine. Whereas, the above strucutral formula is illustrative of the metal-free polyphthalocyanine, it will be readily understood that the metal polyphthalocyanines will have a similar structure. Illustrative of a monomeric metal phthalocyanine is copper phthalocyanine of the following structure:

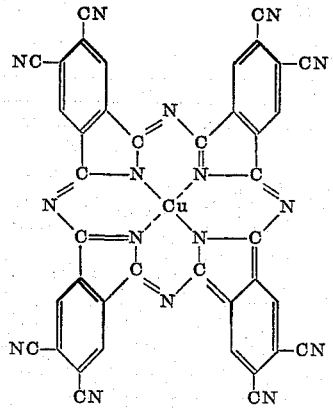

The preparation of the polyphthalocyanines and the metal polyphthalocyanines is described and illustrated in detail in copending application Serial No. 696,027, filed November 13, 1957. Thus, the polymeric materials useful in making the discs or wafers of this invention are, for example, polyphthalocyanine, zinc polyphthalocyanine, copper polyphthalocyanine, iron polyphthalocyanine, cobalt polyphthalocyanine, nickel polyphthalocyanine, palladium polyphthalocyanine, platinum polyphthalocyanine, lead polyphthalocyanine, magnesium polyphthalocyanine, and the like.

The following examples illustrate the preparation of copper polyphthalocyanine useful in making the bodies of the invention.

Example 1

A mixture of 16 grams of pyromellitonitrile, 53 grams of cuprous chloride and 1 gram of urea was heated at 300° C. under 1,000 p.s.i. of nitrogen pressure for 18 hours, and for 2 additional hours at 350° C. After the reaction vessel had cooled to room temperature the solid product was ground using a mortar and pestle. The ground material was triturated with ethanol, acetone, and ethyl acetyl acetate in the order given. No coloring of the solvents occurred, so it is assumed that there was no appreciable extraction from the powdered material. The material was next triturated with pyridine at room temperature and a considerable amount of green material was removed in the pyridine. The sample was then triturated with boiling pyridine until the triturates were colorless, and the triturated material was dried at room temperature. Further processing of the dried material consisted of subjecting the material to vacuum sublimation at 350° C./0.5 mm. of Hg for 72 hours. Some white material sublimed out and was discarded. The residue from the sublimation operation was placed in a soxhlet apparatus and was extracted with pyridine for 48 hours. At the end of this 48 hour period the extracts from the residue were colorless. The residue was then filtered and washed with ethanol. Again the residue was subjected to sublimation procedure heating at 340° C./0.05 mm. of Hg for 6 hours. A small amount of white material sublimed out and was discarded. An elemental analysis of the residue product was as follows:

| Percent | Found | Calc'd for $C_{20}H_4N_8Cu$ |
|---|---|---|
| C | 52.8 | 57.2 |
| H | 1.3 | 0.96 |
| N | 26.6 | 26.7 |
| Cu | 15.9 | 15.1 |

Example 2

This example describes the heat treatment of a sample of the material of Example 1 to produce a material of different composition. A sample of 0.65 gram of a product of Example 1 was heated for 18 hours at 410° C./0.25 mm. of Hg. The sample lost 10.8% of its original weight. An elemental analysis of this heat treated sample was as follows:

| Percent: | Found |
|---|---|
| C | 52.7 |
| H | 1.3 |
| N | 24.2 |
| Cu | 16.6 |

It has been experimentally determined that when copper polyphthalocyanine is made as described hereinabove having an excess of copper over that stoichiometrically required that the material has P-type conductivity; however, when copper polyphthalocyanine is produced having less than the stoichiometric amount of copper then the material has N-type conductivity. The degree of P-type or N-type conductivity will vary with the excess or deficiency of copper. The same situation prevails where other metals than copper are used.

Example 3

Figure 2:
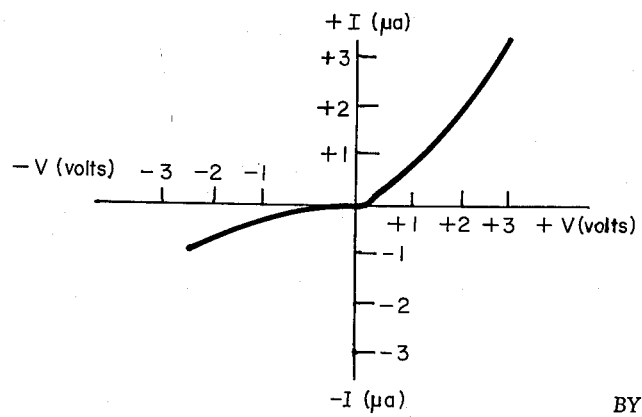

This example illustrates point contact rectification experiments carried out using a disc of copper polyphthalocyanine. A disc of copper polyphthalocyanine prepared from a sample of powdered material made in a manner similar to that described in Example 1 was cold pressed at about 20,000 p.s.i. to form a disc of dimensions 0.19" x 0.12" x 0.033". This disc was coated on one side with silver paint, suitably other noble metal paint can be used, to provide good ohmic contact with the disc for attachment of an electrode. The disc, silver coated side down was placed on top of a gold-plated copper plate, which suitably can be other noble metals, providing good ohmic contact between the silver coated side of the disc and gold-plated copper plate. The point contact electrode for the test apparatus was a pointed copper lead gold-plated on the pointed end thereof, and suitably this point contact electrode can be plated with another noble metal. This gold-plated point was brought to bear on the uncoated top of the copper polyphthalocyanine disc with a force of 50 grams. Electrical leads were attached to the soldering iron and to the gold-plated copper plate. With the electrical leads a variable direct current battery source was connected to the rectifier. Various voltages both positive and negative were applied to the rectifier and the currents at these voltages were measured. Figure 2 is a graph of the data obtained being a plot of the applied voltage in volts vs. the current flowing through the rectifier in microamperes ($\mu$a.). The data of Figure 2 indicates a rectification ratio of about 3 to 1.

The invention will be more clearly understood from the following detailed description of a specific embodiment thereof read in conjunction with the accompanying drawings wherein:

Figure 1 is a schematic view of a rectifier device of the invention connected in a circuit for use; and Figure 2 is a graph of the rectifying properties of a copper polyphthalocyanine disc of the invention.

In Figure 1, device 11 is a point contact rectifier device of the invention. Body 12 in the shape of a disc is suitably a copper polyphthalocyanine body. For optimum rectifying properties disc 12 should not be more than about 40 mils thick and preferably not more than about 10 mils thick. The bottom side of disc 12 has been coated with a silver paint to make ohmic contact therewith and provide a conducting surface for soldering or welding to the disc electrode 14 which is suitably a copper electrode. A suitable solder for soldering electrode 14 to the silvered bottom surface of body 12 is a lead-tin utectic alloy having some cadmium therein. These soldering alloys are commercially available. The upper surface of body 12 is not coated and point contact electrode 13 suitably a phosphor-bronze or a tungsten whisker is pressed against the upper surface of disc 12 to make ohmic contact therewith. Suitably a pressure of about 50 grams of force is used pressing the point contact electrode 13 against the top of disc 12; however, this force might vary from about 10 to about 100 grams more or less, for optimum performance. Suitably the upper end of whisker 13 is soldered or welded to electrode 15 which is suitably a copper electrode. Surrounding and enclosing disc 12 and point contact electrode 13 is glass capsule 16. Glass to metal seals 17 and 18 seal capsule 16 to electrodes 15 and 14, respectively. Such an arrangement as this allows the maintenance of any type of desired atmosphere around disc 12, including high vacuum, if desired. It is very easy to make an opening in the glass capsule to provide the desired atmosphere inside and seal off the opening in the glass to maintain this desired atmosphere. Device 11 is then connected by electrical leads 19 and 20 to an alternating current source 23 to be rectified and an electrical load 21. Suitably, the direct current voltage resulting from the rectified current flowing in the system will appear across resistor 21. Line 22 connects alternating current source 23 and resistor or load 21 completing the electrical circuit. Suitably, alternating current source 23 can be a 110 volt, 60 cycle source or other alternating current source of higher or lower voltage.

In copending applications Serial Nos. 817,058 and 817,059, filed of even date are described various methods or techniques for preparing and/or treating polyphthalocyanines to change the conductivity thereof. These polyphthalocyanines are also useful as polyphthalocyanine bodies for the point contact rectifier devices of this invention, and the metal polyphthalocyanines are especially useful. Some of these methods are discussed below, but they are meant only to be illustrative of the methods and suitable polyphthalocyanine bodies produced therefrom.

By treating or doping the copper polyphthalocyanine powder with bromine and hot pressing the treated material, a disc of permanent P-type material is formed which does not change to N-type upon exposure to the atmosphere or water vapor in which case no encapsulation is necessary. Doping is known in this art as adding small amounts of foreign materials to change the conductivity degree and/or type of a semiconductor material. Normally, when treating copper polyphthalocyanine with gaseous doping agents such as bromine, hydrogen sulfide, oxygen or water vapor, the copper polyphthalocyanine will be saturated with the doping agent at the particular temperature and pressure of treatment, and actual treatments were carried out at room temperature and atomspheric pressure with these doping agents. Rather than treating the powdered material, the bodies, e.g., discs of copper polyphthalocyanine can be treated; however, this type of treatment will probably result in unhomogeneously treated material, which can be desirable in some instances as when P-N junction material is desired. The other halogens as well as bromine used to treat copper polyphthalocyanine will also produce P-type conductivity material. Other materials to treat copper polyphthalocyanine to produce P-type material are oxygen, ozone, sulfur, selenium and tellurium. As has been pointed out hereinabove, copper polyphthalocyanine produced having an excess of copper therein will also be P-type. In the case of oxygen treatment it is desirable to encapsulate the disc in oxygen. The bromine treated or other doped, treated or prepared P-type copper polyphthalocyanine disc can be used in the devices of Figure 1.

Copper polyphthalocyanine produced having a stoichiometric deficiency of copper has N-type conductivity. Also water vapor-saturated copper polyphthalocyanine which is hot pressed to produce a disc or other body has N-type conducitvity provided care is taken to prevent escape of water during hot pressing, or alternatively N-type conductivity can be produced after the disc is formed by water treatment. This hot pressing is suitably carried out at about 220° C. and 20,000 p.s.i. Another type of treatment that produces N-type conductivity in copper polyphthalocyanine is hydrogen sulfide treatment.

The treating or doping treatment used on copper polyphthalocyanine is a method of controlling the degree of electronic (or positive hole) mobility in copper polyphthalocyanine. The degree of mobility varies with the amount and type of doping agent used. In the case of water vapor oxygen mobility changes of the order of ten to one have been produced at room temperature (23° C.).

Although the invention has been described in terms of specified apparatus which is set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. A point contact rectifier device comprising a polyphthalocyanine body, an electrode making ohmic contact with said body and a point contact electrode attached to said body.

2. The device of claim 1, wherein said polyphthalocyanine is a metal polyphthalocyanine.

3. The device of claim 1, wherein said polyphthalocyanine is copper polyphthalocyanine.

4. A point contact rectifier device comprising a polyphathalocyanine body, a point contact electrode attached to said body, and a conducting surface on a portion of said body to facilitate electrical connections thereto.

5. The device of claim 4, wherein said polyphthalocyanine is a metal polyphthalocyanine.

6. The device of claim 4, wherein said polyphthalocyanine is a copper polyphthalocyanine.

7. The device of claim 6, wherein said body is a disc which is not more than about 40 mils thick.

8. The device of claim 6, wherein the point of the point contact electrode has a diameter of not more than about 1 mil and said point contact electrode is pressed against said disc with a force between about 10 and about 100 grams thereby making good ohmic contact with said disc.

9. The device of claim 6, wherein said point contact electrode is a Phosphor-bronze whisker.

10. The device of claim 6, wherein said point contact electrode is a tungsten whisker.

11. A point contact rectifier device comprising a polyphthalocyanine disc, said disc being coated on one side with a conducting surface, a first metal electrode attached to the conducting surface of said disc, a point contact electrode making ohmic contact with the uncoated side of said disc, the other end of said point contact electrode being attached to a second metal electrode, a glass capsule enclosing said disc and said point contact electrode, said capsule being joined to said first and second electrodes by glass-metal seals.

12. The device of claim 11, wherein said polyphthalocyanine is a metal polyphthalocyanine.

13. The device of claim 11, wherein said polyphthalocyanine is a copper polyphthalocyanine.

14. A point contact rectifier device comprising a polyphthalocyanine body, a noble metal-plated point contact electrode attached to said body, a noble metal conducting surface on a portion of said body, and a noble metal-plated electrode in contact with said conducting surface.

15. The device of claim 14, wherein said polyphthalocyanine is a metal polyphthalocyanine.

16. The device of claim 14, wherein said polyphthalocyanine is copper polyphthalocyanine.

17. The device of claim 16, wherein said point contact electrode is gold plated, said conducting surface is silver, and said electrode is gold plate.

No references cited.